(12) United States Patent
Pannek et al.

(10) Patent No.: US 11,614,161 B2
(45) Date of Patent: Mar. 28, 2023

(54) METHOD FOR DETERMINING REFERENCE VALUES OF A SENSOR (71) Applicant: ZF Friedrichshafen AG, Friedrichshafen (DE)

(72) Inventors: Christian Pannek, Friedrichshafen (DE); Martina Jehle, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 669 days.

(21) Appl. No.: 16/700,817

(22) Filed: Dec. 2, 2019

(65) Prior Publication Data
US 2020/0173821 A1 Jun. 4, 2020

(30) Foreign Application Priority Data
Dec. 3, 2018 (DE) ...................... 10 2018 220 874.3

(51) Int. Cl.
*F16H 59/68* (2006.01)
*F16H 61/00* (2006.01)

(52) U.S. Cl.
CPC ..... *F16H 59/68* (2013.01); *F16H 2059/6807* (2013.01); *F16H 2061/0087* (2013.01); *F16H 2342/042* (2013.01)

(58) Field of Classification Search
None
See application file for complete search history.

(56) References Cited

U.S. PATENT DOCUMENTS

| 7,789,792 | B2 | 9/2010 | Kamm et al. |
| 8,398,522 | B2 | 3/2013 | Bauknecht et al. |
| 9,625,032 | B2 | 4/2017 | Maurer et al. |
| 9,777,833 | B2 | 10/2017 | Cueppers et al. |

(Continued)

FOREIGN PATENT DOCUMENTS

| DE | 102005002337 A1 | 8/2006 |
| DE | 19916006 B4 | 1/2007 |
| DE | 102008000429 A1 | 9/2009 |

(Continued)

OTHER PUBLICATIONS

German Search Report DE102018220874.3, dated Aug. 8, 2019. (12 pages).

*Primary Examiner* — Timothy Hannon
(74) *Attorney, Agent, or Firm* — Dority & Manning, P.A.

(57) ABSTRACT

A method for determining reference values of a sensor corresponding to a disengaged operating condition or to an engaged operating condition of a hydraulically actuatable, form-locking shift element (A, F), where at least one operating parameter of the form-locking shift element (A, F) is detected with the sensor during a disengagement and during an engagement of the form-locking shift element (A, F). The method may include subdividing an operating range of the shift form-locking element (A, F) into temperature and pressure classes. The method may further include determining a deviation between a current reference value for a temperature and pressure class of the temperature and pressure classes and an adapted reference value previously determined for the temperature and pressure class. Additionally, the method may include increasing or decreasing the adapted reference value by a predefined increment based on the deviation.

16 Claims, 3 Drawing Sheets

(56) References Cited

U.S. PATENT DOCUMENTS

2007/0010926 A1* 1/2007 Dlugoss ............... F16H 61/061
  701/51
2016/0258530 A1* 9/2016 Maurer ............... F16H 61/0403

FOREIGN PATENT DOCUMENTS

| DE | 102013222381 A1 | 5/2015 |
| DE | 102014225453 A1 | 6/2016 |
| DE | 102016217281 A1 | 3/2018 |

* cited by examiner

METHOD FOR DETERMINING REFERENCE VALUES OF A SENSOR

CROSS-REFERENCE TO RELATED APPLICATION

The present application is related and has right of priority to German Patent Application No. 10 2018 220 874.3 filed on Dec. 3, 2018, the entirety of which is incorporated by reference for all purposes. Additionally, the present application is related to German Patent Application No. 10 2018 220 872.7 filed on Dec. 3, 2018, the entirety of which is incorporated by reference for all purposes.

FIELD OF THE INVENTION

The invention relates generally to a method for determining reference values of a sensor. Moreover, the invention relates to a control unit for carrying out the method and to a corresponding computer program.

BACKGROUND

DE 10 2005 002 337 A1 describes an eight-speed multi-stage transmission having friction-locking shift elements. The shift elements are multi-disk clutches or multi-disk brakes. In the presence of a shift request for a ratio change in the transmission, at least one of the friction-locking shift elements is to be disengaged from the power flow of the transmission device and at least one further friction-locking shift element is to be engaged into the power flow of the transmission device, in order to transmit a torque.

In general, in the presence of a demand to disengage a friction-locking shift element, regardless of the torque presently transmitted via the friction-locking shift element, it is assumed that the friction-locking shift element is actually transitioning into the disengaged operating condition. To the same extent, a demand to engage a friction-locking shift element is also implementable using comparatively little outlay for open-loop and closed-loop control.

For this reason, a simple software-based evaluation of an actuating current of a pressure regulator of a friction-locking shift element is sufficient. During the determination of an appropriate disengagement control signal or an appropriate engagement control signal for transferring the friction-locking shift element into its disengaged operating condition or its engaged operating condition, respectively, it can be easily verified whether a shift change or gearchange was successful via such evaluation.

Disadvantageously, however, friction-locking shift elements in the disengaged operating condition cause drag torques, which adversely affect an overall efficiency of an automatic transmission to an undesirable extent.

For this reason, transmission devices, such as those described in DE 10 2008 000 429 A1, increasingly include not only friction-locking shift elements but also form-locking shift elements. These types of form-locking shift elements usually have two shift-element halves. The shift-element halves are brought into form-locking engagement with one another via axial displacement of at least one movable shift-element half with respect to the other shift-element half, which is not axially displaceable, at dog elements, or the like of the shift-element halves. Thereupon, the form-locking shift element is engaged and transmits an applied torque. Moreover, it is also possible that both shift-element halves are axially movable with respect to one another.

If the form-locking shift element is to be disengaged from the power flow, the positive engagement between the shift-element halves is disengaged via axial displacement of the movable shift-element half with respect to the axially fixed shift-element half. Form-locking shift elements are used because, in contrast to friction-locking shift elements, essentially no drag torques occur with disengaged form-locking shift elements. Drag torques adversely affect the overall efficiency of a transmission. However, form-locking shift elements, as compared to friction-locking shift elements, are transferable out of a disengaged operating condition, in which no torque is transmitted by the form-locking shift elements, into their engaged operating condition only close to their synchronous speed.

Additionally, form-locking shift elements engaged into the power flow of a transmission device are disengageable from the power flow or transferable into their disengaged operating condition using low shifting forces if the applied torque has an appropriately low value. During gear change operations, or gear disengagement operations, a power flow between a transmission input shaft and a transmission output shaft is to be interrupted in the transmission. In this case, a form-locking shift element is to be transferred, if necessary, from its engaged operating condition into its disengaged operating condition. Due to an excessively rapid or faulty build-up of the torque applied to the form-locking shift element, or due to a faulty reduction of the applied torque, the form-locking shift element may not be transferable into its disengaged operating condition. In addition, it is also possible that mechanical, hydraulic, or electrical malfunctions prevent the disengagement of a form-locking shift element. For this reason, form-locking shift elements, in contrast to friction-locking shift elements, do not necessarily transition into a disengaged operating condition in the presence of an appropriate disengagement control signal.

Additionally, it is also possible that a disengaged form-locking shift element is not transferable into its engaged operating condition within desirably short operating times. This is the case, for example, when the sought positive engagement between the shift-element halves cannot be established due to a so-called tooth-on-tooth position. In the event of such a tooth-on-tooth position, dog elements of the shift-element halves rest against one another at their end faces and the differential speed between the shift-element halves is zero. Such a tooth-on-tooth position is released only when a torque present at the form-locking shift element is greater than the static friction torque between the end faces of the dog elements of the shift-element halves.

Moreover, the establishment of a complete positive engagement between the shift-element halves or the complete engagement of a form-locking shift element is also preventable by a so-called flank clamping between the flanks of the dog elements. In the event of such a flank clamping, the two shift-element halves have an axial overlap of their dog elements. However, the static friction between the flanks of the dog elements of the shift-element halves, which are resting against one another, is so high that the engagement force acting on the shift elements in the engagement direction is not sufficient to overcome the static friction and completely engage the form-locking shift element.

Sensors are installed in order to be able to monitor the particular existing operating condition of a form-locking shift element. These sensors include, for example, a permanent magnet and a measuring unit for sensing the magnetic field of the permanent magnet. Additionally, the sensors have a ferromagnetic sensor contour, which influences the magnetic field of the permanent magnet depending on the operating conditions of the shift-element halves. Various magnetic field-sensing elements are known, such as elements or magnetoresistive elements based on a Hall effect. Magnetic field sensors generally have elements sensing a magnetic field or other electronic components, wherein some magnetic field sensors have permanent magnets in a back-biased arrangement.

These types of magnetic field sensors provide electrical signals, which represent the condition of a sensed magnetic field. In some embodiments, magnetic field sensors cooperate with ferromagnetic objects. Using the magnetic field sensors, magnetic field fluctuations are determined, which are caused by an object moved through the magnetic field of a magnet of a magnetic field sensor. The magnetic field monitored with the magnetic field sensor also varies, as is known, depending on a shape or a profile of the moving ferromagnetic object. The position determination of the shift-element halves is calculated directly from the raw signals of the sensors using applicable thresholds.

The values of the sensor signal have a non-negligible scattering, which does not allow for a precise determination of a current dog position. For this reason, a value range of the sensor signal is utilized in each case for the determination, by the sensor, of a current dog position, which is delimited for the relevant dog position by the particular maximum sensor signal and the minimum sensor signal received. Additionally, the values of the signal of such a sensor also vary depending on a position change of the overall form-locking shift element of a transmission with respect to the sensor. Such a position change results from so-called gear clearance, which varies depending on the particular torque to be transmitted via the transmission and depending on manufacturing tolerances of the transmission and of the form-locking shift element.

Disadvantageously, all tolerances of the sensor and of the sensing system, as well as the production-related scatterings, therefore flow into the position determination. As a result, the position determination of the shift-element halves does not have the accuracy necessary for operating a transmission.

Moreover, it is disadvantageous that a so-called service life drift of the dog position determination and temperature-dependent as well as system pressure-dependent tolerances of the sensing system are not taken into account in the determination of the end positions of the shift-element halves of a form-locking shift element. The service life drift results from wear in the area of the shift-element halves of a form-locking shift element. The wear, which increases over the service life, causes the positions of the end positions of the movable shift-element half, which correspond to the disengaged condition or to the engaged condition of the form-locking shift element, to change.

Thus, the problem addressed by the invention is that of creating a method for determining reference values of a sensor, by which an operating condition of a form-locking shift element is easily determined with great accuracy. Additionally, a control unit for carrying out the method, and a computer program product for carrying out the method are to be described.

SUMMARY OF THE INVENTION

A method is provided for determining reference values of a sensor, which correspond to a disengaged operating condition or to an engaged operating condition of a form-locking shift element. With the sensor, at least one operating parameter of the shift element is determined during a disengagement and during an engagement of the shift element.

In the present case, for example, constant-mesh shift elements, which transmit a torque via a form-locking connection, are subsumed under the term "form-locking shift element". Moreover, shift elements such as clutches or brakes in the present case are subsumed in the following under the term "friction-locking shift element", which transmit a torque via a friction-locking connection. The torque transmittable with such a friction-locking shift element varies depending on the particular engagement force applied to the friction-locking shift element and is preferably infinitely variable. The engagement force corresponds, for example, to a hydraulic pressure applied to the shift element. In contrast thereto, the torque transmittable with a form-locking shift element is not infinitely variable.

Moreover, in the present case, the term "reference values of a sensor" is understood to mean values of a sensor signal that correspond to a current operating condition of a form-locking shift element. In particular, these are the sensor values that are determined, by the sensor, in the end positions of a movable shift-element half, whose axial actuating movement is monitored with the sensor. The two end positions of a movable shift-element half correspond to a completely engaged operating condition and to a completely disengaged operating condition of a form-locking shift element.

The invention now encompasses the technical teaching that an operating range of the shift element is subdivided into temperature and pressure classes. Moreover, with the approach according to the invention, a deviation is determined between a particular reference value currently determined for a temperature and pressure class and an adapted reference value that is already present for this temperature and pressure class. The adapted reference value that is already available is increased or decreased by a predefined increment depending on the deviation.

In other words, it is ensured, with the approach according to the invention, that a service life drift, temperature-dependent tolerances of the sensing system, as well as system pressure-dependent tolerances of the sensing system are taken into account, in a simple way, in the determination of the end position of the shift-element halves of a form-locking shift element and compensated for.

It is possible to take the determination of the reference values of the sensor into account depending on a temperature of an oil sump as well as a system pressure of a hydraulic system of a transmission if the form-locking shift element is a shift element of a transmission.

In principle, with the approach according to the invention, the newly determined position value of the end position of the particular movable shift-element half is compared to the previously determined adaptation values of the temperature and pressure classes every time an end position has been reached, starting from a completely disengaged operating condition or starting from a completely engaged operating condition. If the current value is higher, the value of the current adaptation class is increased by a parameterizable value. If the currently determined value is less than the previously determined adaptation value, the previously determined value of the current adaptation class is reduced by a parameterizable value.

The term "parameterizable" in combination with a value, an adaptation step, an operating parameter, or the like, is understood, in the present case, to be such a parameter or such a value, whose quantity or value is changeable without the need to carry out a reprogramming or a reinstallation of a control unit software of a control unit.

Due to the fact that the current value is not utilized directly, but rather is adapted only in predefined increments in the particular relevant direction, it is avoided, in a simple way, that the adaptation is carried out for implausible values. As a result, erroneously determined sensor signals, which are determined due to temporarily present operating conditions of the shift element, have no substantial influence on the adaptation.

In an advantageous embodiment of the method according to the invention, the increment of the adaptation is reduced for each temperature and pressure class as the number of adaptations of the reference value of the relevant temperature and pressure class increases.

This means, the parameterizable increment is reduced after a certain number of adaptations have been carried out. As a result, it is achieved, with little outlay, that the adaptation is initially implemented in a rougher and faster manner and, as the number of adaptations increases, a finer adaptation takes place.

Additionally, it is provided that the determined adaptation values are added, as an offset value, to initially learned end positions or reference values of the sensor only if a parameterizable number of adaptations were carried out for both end positions of the particular movable shift-element half. The two end positions correspond to a completely disengaged operating condition and to a completely engaged operating condition, respectively, of the form-locking shift element.

In this way, it is ensured that the adaptations depict the physical end positions of the particular movable shift-element half as precisely as possible before they form the basis for the end position detection.

In an advantageous embodiment of the method according to the invention, a torque present at the form-locking shift element, an actuation force of the shift element, and a differential speed between shift-element halves varies during the determination of the reference values. These operating variables are varied such that the form-locking shift element is transferred into its disengaged operating condition or into its engaged operating condition in the presence of an appropriate demand.

It is therefore simply ensured that the form-locking shift element is actuated, during the determination of the reference values of the sensor, to such an extent that the form-locking shift element is transferred, with the necessary probability, into the demanded operating condition, for which the particular reference value of the sensor corresponding thereto is to be determined.

Therefore, a learning routine is available for the determination of the so-called dog end positions, which correspond to a completely disengaged operating condition and to a completely engaged operating condition of a form-locking shift element, respectively.

Through this learning routine, sensor values corresponding to the dog end positions are determined for each transmission in a specimen-specific manner, i.e., for each form-locking shift element of a transmission individually and with the desired accuracy. The determined sensor values are saved or stored, for example, in a non-volatile memory.

This advantageously offers the possibility of being able to carry out the determination of the dog position or the position of the shift-element halves with respect to one another during the subsequent operation of a transmission having the form-locking shift element with generally valid parameters or reference values of a sensor on the basis of the determined end positions. The learning routine is also carried out after an exchange of a control unit, a transmission, or a sensor.

In an embodiment of the method according to the invention, an actuation force, which is greater than a threshold value and acts in the disengagement direction of the shift element, is applied to the shift element during the determination of the reference value of the sensor that corresponds to the disengaged operating condition of the shift element. It is advantageous if the threshold value nearly corresponds to the actuation force that is the maximum possible and acts in the disengagement direction of the form-locking shift element. Thereupon, the form-locking shift element very likely transitions into its disengaged operating condition as demanded.

In an embodiment of the method according to the invention, a torque present at the shift element is adjusted to values less than a threshold value during the determination of the reference value of the sensor that corresponds to the disengaged operating condition of the shift element. Therefore, it is ensured, in a simple way, that the form-locking shift element is transferred into its disengaged operating condition as demanded and the reference value of the sensor corresponding thereto is determined with great accuracy.

In an embodiment of the method according to the invention, a differential speed between the shift-element halves of the form-locking shift element is adjusted, in each case, to values within a speed range during the determination of the reference value of the sensor that corresponds to the engaged operating condition of the shift element. The speed range encompasses the zero point of the differential speed or the synchronous speed of the form-locking shift element. Within the speed range, the shift-element halves are brought into engagement with one another in a form-locking manner. With this approach, it is very likely ensured that the form-locking shift element is transferred into its engaged operating condition as demanded and the reference value of the sensor corresponding thereto is determined with great accuracy.

In a further advantageous embodiment of the method according to the invention, a torque present at the shift element is adjusted, in each case, to values greater than a threshold value during the determination of the reference value of the sensor that corresponds to the engaged operating condition of the shift element and before a positive engagement between the shift-element halves. The threshold value of the torque advantageously corresponds to a torque value, above which a tooth-on-tooth position between the shift-element halves of the shift element does not take place. The threshold value corresponds to a limit of the torque value present at the shift element, above which a static friction possibly present between the shift-element halves, which are not yet in overlap, is overcome. Therefore, the establishment of the demanded positive engagement is carried out to the desired extent.

In a further advantageous embodiment of the method according to the invention, an actuation force present at the shift element is adjusted, in each case, to values less than a threshold value during the determination of the reference value of the sensor that corresponds to the engaged operating condition and before a positive engagement between the shift-element halves. The threshold value advantageously represents a limit of the actuation force, below which a tooth-on-tooth position between the shift-element halves does not take place and the form-locking shift element is transferable into its engaged operating condition. With this approach, it is ensured that static friction does not build up between the shift-element halves, which are not yet in overlap, which facilitates or brings about a tooth-on-tooth position and prevents the engagement of the form-locking shift element.

Moreover, it is provided that a torque present at the shift element is adjusted, in each case, to values less than a threshold value during the determination of the reference value of the sensor that corresponds to the engaged operating condition and in the presence of a positive engagement between the shift-element halves. The threshold value advantageously represents a limit of the torque, below which a flank clamping between the shift-element halves does not take place and the form-locking shift element is transferable into its engaged operating condition to the desired extent.

In addition, it is provided that an actuation force present at the shift element is adjusted, in each case, to values greater than a threshold value during the determination of the reference value of the sensor that corresponds to the engaged operating condition and in the presence of a positive engagement between the shift-element halves. Advantageously, the threshold value is defined such that, upon an actuation of the shift element with an actuation force above the threshold value, a flank clamping between the shift-element halves does not take place and the shift element is transferable into its engaged operating condition. As a result, the reference value of the sensor that corresponds to the engaged operating condition of the shift element is determined with the desired great accuracy.

In a further advantageous embodiment of the method according to the invention, the reference values of the sensor are determined several times in succession. It is provided that the determined reference values are compared to one another. In the case of a determination of a deviation between the reference values within a tolerance range, the reference values are permanently stored.

In this approach, the possibility is ruled out that the form-locking shift element is not transferred into the completely disengaged operating condition or into the completely engaged operating condition and a faulty determination of the reference values takes place during the determination of the reference values of the sensor.

In an embodiment of the method according to the invention, which is carried out with little outlay for open-loop and closed-loop control, the operating parameter of the shift element corresponds to a travel of a shift-element half of the shift element, which is displaceable in a translatory manner with respect to the other shift-element half of the form-locking shift element.

In a further advantageous embodiment of the method according to the invention, the torque present at the form-locking shift element is varied by an appropriate actuation of friction-locking shift elements of a transmission if the form-locking shift element is a shift element of the transmission.

Alternatively, or additionally, it is also possible to vary the torque present at the form-locking shift element by appropriately adjusting a torque present at the transmission input shaft if the transmission has a transmission input shaft. This is easily implementable, for example, by varying a drive torque of a prime mover of a vehicle drive train, which is operatively connected to the transmission input shaft.

The invention also relates to a control unit, which carries out the method according to the invention. The control unit has, for example, means utilized for carrying out the method according to the invention. These means are hardware-related means and software-related means. The hardware-related means of the control unit or of the control device are, for example, data interfaces for exchanging data with the assemblies of the vehicle drive train contributing to the carrying-out of the method according to the invention. Further hardware-related means are, for example, a memory for data storage and a processor for data processing. Software-related means are, inter alia, program modules for carrying out the method according to the invention.

In order to carry out the method according to the invention, the control unit is operable using at least one receiver interface, which receives signals from signal transmitters. The signal transmitters are, for example, sensors, which gather measured quantities and transmit them to the control unit. A signal transmitter is also referred to as a signal sensoring element. In this way, the receiver interface receives a signal from a signal transmitter, via which it is signaled that a reference value of a sensor is to be determined. The signal is generated, for example, by an operator, in that the operator actuates a control element, via which such a determination is demanded. Moreover, the signal is also generatable by a driving strategy, which is activated and carried out in the area of the control unit or in the area of a further control unit of the vehicle drive train.

The control unit also has a data processing unit, in order to evaluate and/or process the received input signals or the information of the received input signals.

The control unit also includes a transmit interface, which outputs control signals to actuating elements. An actuating element is understood to be actuators that implement the commands of the control unit. The actuators are, for example, electromagnetic valves.

If, during the actuation of the form-locking shift element, it is detected with the control unit for determining reference values of a sensor or if it is determined on the basis of received input signals that at least one operating parameter of the shift element is to be determined, with the sensor, during a disengagement or during an engagement of the shift element, then the control unit determines an appropriate demand on the basis of detected input signals and initiates an appropriate determination. The reference values correspond to a disengaged operating condition or to an engaged operating condition of the form-locking shift element.

The control unit subdivides an operating range of the shift element into temperature and pressure classes and determines a deviation between a particular reference value currently determined for a temperature and pressure class and an adapted reference value that is already present for this temperature and pressure class. Additionally, the adapted reference value that is already available is increased or decreased by a predefined increment depending on the deviation.

As a result, it is simply ensured that a service life drift and temperature-dependent as well as system pressure-dependent tolerances of the sensing system are taken into account in the determination of the end positions of the shift-element halves of a form-locking shift element.

The aforementioned signals are to be considered merely as examples and are not intended to limit the invention. The gathered input signals and the output control signals are transmittable via a vehicle bus, for example, via a CAN-BUS. The control device or the control unit is, for example, a central electronic control unit of the vehicle drive train or an electronic transmission control unit.

The approach according to the invention is also embodied as a computer program product, which, when running on a processor of a control device, instructs the processor from the software point of view to carry out the assigned method steps, which are subjects of the invention. In this context, a machine-readable medium, on which an above-described computer program product is retrievably stored, is also a subject of the invention.

BRIEF DESCRIPTION OF THE DRAWINGS

Preferred refinements result from the dependent claims and the following description. An exemplary embodiment of the invention is explained in greater detail with reference to the drawing, without being limited thereto. Wherein:

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
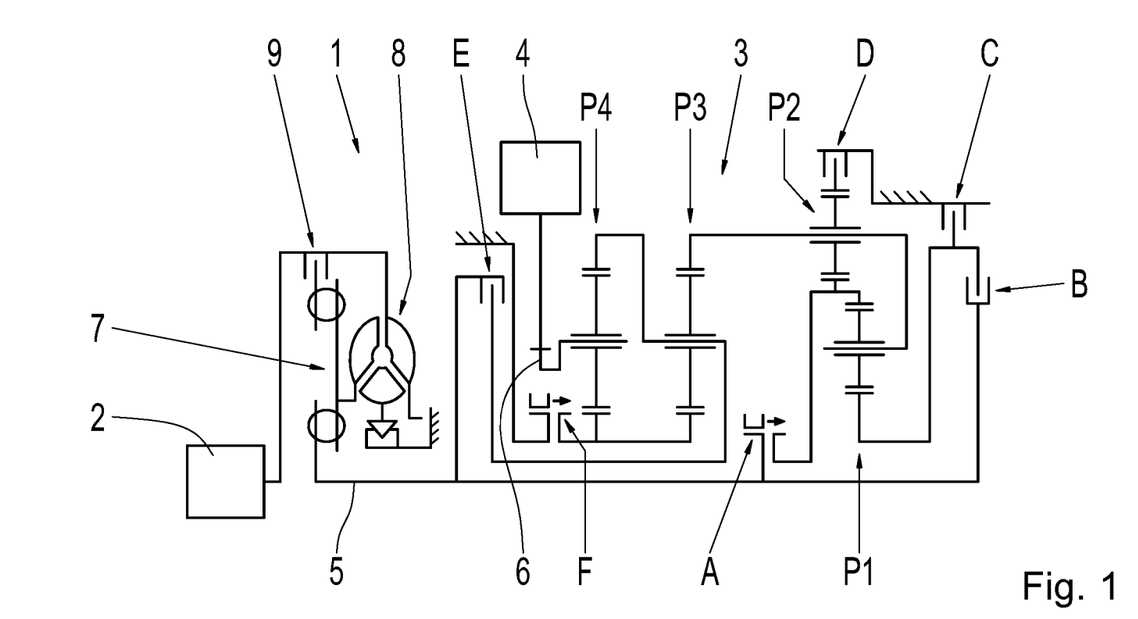
FIG. 1 shows a schematic view of a vehicle drive train having a prime mover, a transmission, and a driven end.

FIG. 1 shows a schematic of a vehicle drive train 1 having a prime mover 2, a transmission 3, and a driven end 4. The prime mover 2 is an internal combustion engine in this case. The transmission 3 is an automatic transmission, in which multiple gear stages "1"-"9" for forward travel and at least one gear stage "R" for travel in reverse are implementable. Depending on the particular configuration of the vehicle drive train 1, the driven end 4 has one, two, or more drivable vehicle axles, to which the torque of the prime mover 2 is applied via the transmission 3. The transmission 3 has hydraulically actuatable shift elements including a first shift element A, a second shift element B, a third shift element C, a fourth shift element D, a fifth shift element E, and a sixth shift element F. The hydraulically actuatable shift elements A-F are actuated during a ratio change in the transmission 3, i.e., during upshifts or downshifts. The ratio changes are carried out essentially without an interruption of tractive force, in combination with a high level of ride comfort and at a desired level of performance. The term "performance" is understood to mean, in each case, a ratio change in the transmission 3 that is implemented within a defined operating time.

In order to carry out the particular demanded gear shift to the desired extent, the shift elements A-F are acted upon by shift sequences stored in a transmission control unit and a shift pressure corresponding to the particular shift sequence.

The transmission 3 has a transmission input shaft 5 and a transmission output shaft 6. The transmission output shaft 6 is connected to the driven end 4. In the present case, a torsion damper 7 and, as a starting component, a hydrodynamic torque converter 8 having an associated torque converter lockup clutch 9, are arranged between the transmission input shaft 5 and the prime mover 2.

In addition, the transmission 3 has a first planetary gear set P1, a second planetary gear set P2, a third planetary gear set, and a fourth planetary gear set −P4. The first planetary gear set P1 and the second planetary gear set P2, which are preferably minus planetary gear sets, form a shiftable front-mounted gear set. The third planetary gear set P3 and the fourth planetary gear set P4 represent a so-called main gear set. The third, fourth, and sixth shift elements C, D, and F of the transmission 3 are brakes, while the first, second, and fifth shift elements A, B, and E represent so-called separating clutches.

Figure 2:
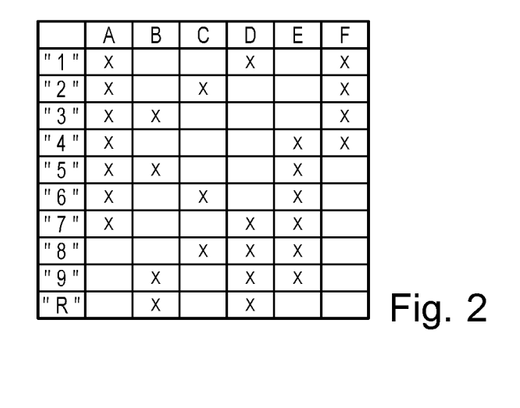
FIG. 2 shows a shift logic table for the transmission shown in FIG. 1.

A selective shifting of the gear stages "1"-"R" is implementable with the shift elements A-F according to the shift logic represented in greater detail in FIG. 2. In order to establish a power flow in the transmission, essentially three of the shift elements A-F are to be transferred into or held in an engaged operating condition essentially simultaneously for each gear stage.

The first and sixth shift elements A, F are, in this case, form-locking shift elements without additional synchronization. As a result, in the case of the transmission 3, as compared to transmissions including only friction-locking shift elements, drag torques caused by disengaged friction-locking shift elements are reduced.

As is known, form-locking shift elements are generally transferable out of a disengaged operating condition into an engaged operating condition only within a very narrow differential speed range, encompassing the synchronous speed, between the shift-element halves to be brought into an operative connection with one another in a form-locking manner. If the synchronization of a form-locking shift element to be engaged is not carried out with additional structural embodiments, the synchronization is implemented via an appropriate actuation of the further friction-locking shift elements contributing to the gear shift and/or a so-called engine override. During such an engine override, for example, the drive torque made available by the prime mover 2 is varied in the coasting condition as well as in the traction operation of the vehicle drive train 1 to the extent necessary for the synchronization. This also applies for the actuation of the friction-locking shift elements during the carrying-out of demanded traction or coasting shifts.

Figure 3A:
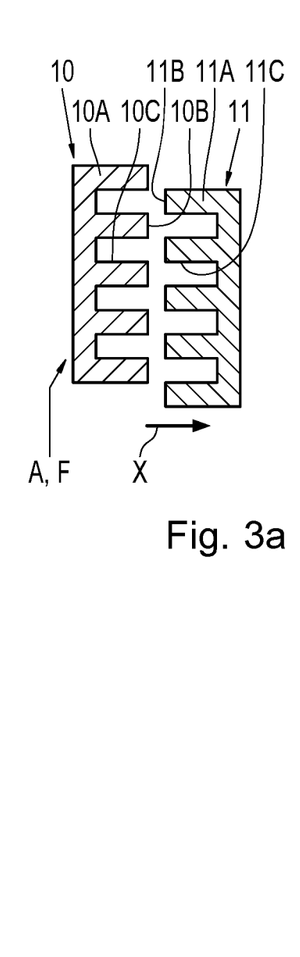
FIGS. 3a-3e show various, highly schematic views of operating conditions of a form-locking shift element between a completely disengaged condition and a completely engaged condition.

FIGS. 3a-3e each show a first shift-element half 10 and a second shift-element half 11 of the form-locking shift element A, F in various operating conditions. FIG. 3a shows the completely disengaged operating condition of the form-locking shift element A, F, in which there is no positive engagement between the two shift-element halves 10, 11 and in which the shift-element halves 10, 11 are spaced apart from one another in the axial direction x.

The first shift-element half 10 has first dog elements 10A and the second shift-element half 11 has second dog elements 11A. The dog elements 10A, 11A are brought into engagement with one another in a form-locking manner depending on the particular current application via axial displacement of the first shift-element half 10 relative to the second shift-element half 11 and/or of the second shift-element half 11 relative to the first shift-element half 10 to transmit a torque present at the form-locking shift element A, F to the desired extent.

In the presence of an appropriate demand to engage the form-locking shift element A, F, an appropriate actuation force is applied in the engagement direction at the particular displaceable shift-element half 10, 11. As a result, the axial distance between end faces 10B, 11B of the dog elements 10A, 11A facing one another is increasingly reduced.

If the differential speed between the shift-element halves 10, 11 is too great, the dog elements 10A, 11A are not brought into engagement with one another in a form-locking manner. In such a case, a so-called rattling occurs, during which the dog elements 10A, 11A glide off of one another at their facing end faces 10B, 11B in the circumferential direction of the shift-element halves 10, 11 to the extent shown in FIG. 3b. Such a rattling is undesirable, however, since it causes irreversible damage of the dog elements 10A, 11A as the period of operation increases.

Figure 3B:
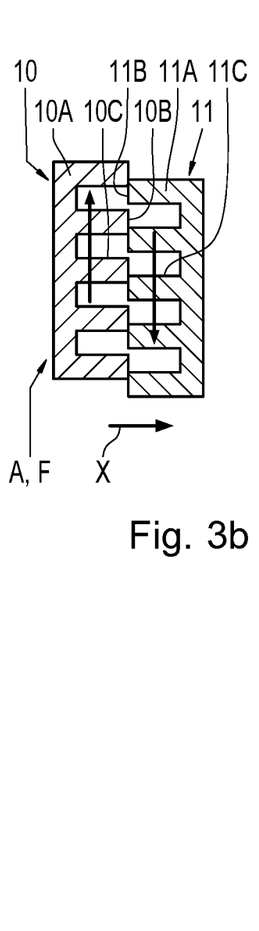

For this reason, the differential speed between the shift-element halves 10, 11 is adjusted to values within a differential speed window, which encompasses the synchronous speed of the form-locking shift element A, F, via appropriate actuation of the particular friction-locking shift elements B-E contributing to the operating condition change in the transmission 3. Within this differential speed window, the dog elements 10A, 11A of the shift-element halves 10, 11—are brought into engagement with each other in a form-locking manner to the desired extent.

Figure 3C:
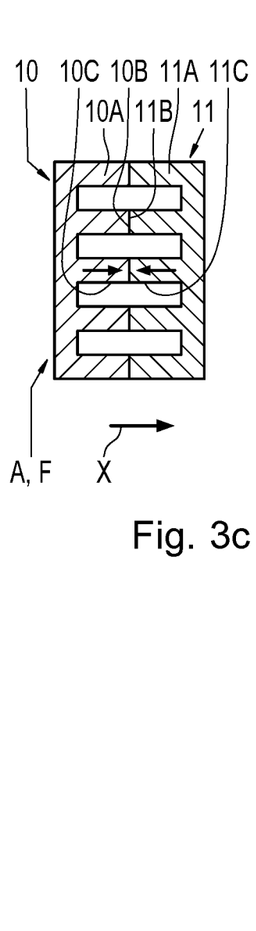

However, the positive engagement to be established is preventable by a so-called tooth-on-tooth position between the shift-element halves 10, 11. The tooth-on-tooth position, as represented in FIG. 3c, is characterized in that the dog elements 10A, 11A rest against one another at their end faces 10B and 11B, and the differential speed between the shift-element halves 10, 11 is zero. During such a tooth-on-tooth position of the form-locking shift element A, F, the static friction between the end faces 10B, 11B of the dog elements 10A, 11A is so great that the torque present at the form-locking shift element A, F is transmitted via the form-locking shift element A, F without the tooth-on-tooth position being released.

In order to release the tooth-on-tooth position, it is advantageous if the actuation force acting on the form-locking shift element A, F in the engagement direction is reduced and/or the torque present at the form-locking shift element A, F is increased. The static friction in the area between the end faces 10B, 11B of the dog elements 10A, 11A is lowered via the reduction of the engagement force. Simultaneously, by raising the torque present at the form-locking shift element A, F, the static friction between the end faces 10B, 11B is overcome and the differential speed between the shift-element halves 10,11 increases to an extent that enables the positive engagement between the dog elements 10A, 11A to be established.

Figure 3D:
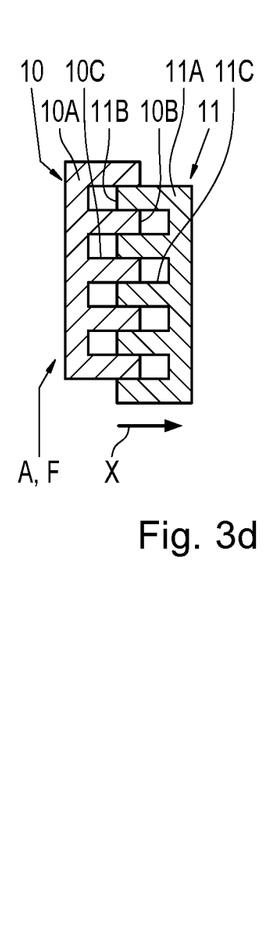

FIG. 3d shows an operating condition of the form-locking shift element A, F, in which a positive engagement between the shift-element halves 10, 11 is present with a so-called partial overlap of the dog elements 10A, 11A. Such an operating condition is present during a disengagement process as well as during an engagement process of the form-locking shift element A, F.

The torque acting on the shift element A, F and the coefficients of friction of the flanks 10C, 11C yield a static friction force which acts between the flanks 10C, 11C. If the actuation force acting on the shift-element halves 10, 11 in the disengagement direction or in the engagement direction of the form-locking shift element A, F is too low in relation to the static friction force between the flanks 10C, 11C of the dog elements 10A, 11A, so-called flank clamping occurs. During flank clamping, the axial relative actuating movement between the shift-element halves 10, 11 in the engagement direction or in the disengagement direction is zero, and so the demanded operating condition change of the form-locking shift element A, F does not take place. In order to prevent or release such a flank clamping, the actuation force acting on the shift element A, F, for example, is raised and/or the particular torque present at the form-locking shift element A, F is reduced to the extent necessary for this purpose.

Figure 3E:
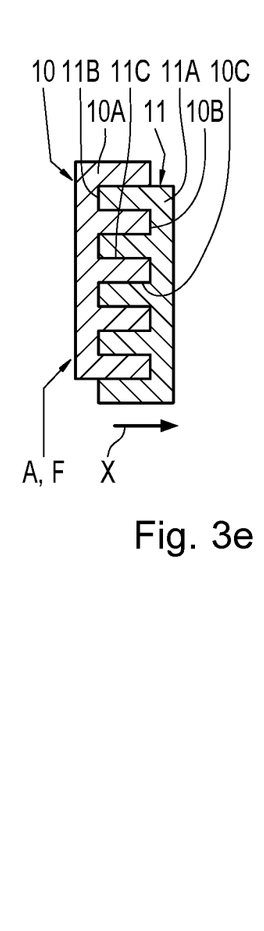

The completely engaged operating condition of the form-locking shift element A, F is represented in FIG. 3e, in which the full overlap between the dog elements 10A, 11A in the axial direction x is present.

FIGS. 4a-4f each show a representation of the form-locking shift element A, F corresponding to FIG. 3a. In the case of the shift element A, F, the dog elements 10A, 11A of the shift-element halves 10, 11, respectively, which are arranged next to one another in the circumferential direction of the shift-element halves 10, 11, each have a different length in the axial direction x. In the following, the first shift-element half 10 has longer dog elements 10A1 and shorter dog elements 10A2, while the second shift-element half 11 has longer dog elements 11A1 and shorter dog elements 11A2.

This embodiment of the form-locking shift elements A, F offers the advantage that the positive engagement between the shift-element halves 10, 11 is established at higher differential speeds between the shift-element halves 10, 11 than is the case with the embodiment of the form-locking shift elements A, F represented in FIGS. 3a-3e. In contrast thereto, the embodiment of the form-locking shift element A, F according to FIGS. 4a-4f is less robust against rattling as compared to the embodiment of the form-locking shift element A, F according to FIGS. 3a-3e.

The shift element A, F has further operating conditions, due to the combination of longer dog elements 10A1, 11A1 and the shorter dog elements 10A2, 11A2, in addition to the operating conditions of the form-locking shift element A, F described with reference to FIGS. 3a-3e. The further operating conditions will be described in greater detail in the following description of FIGS. 4a-4f.

Figure 4A:
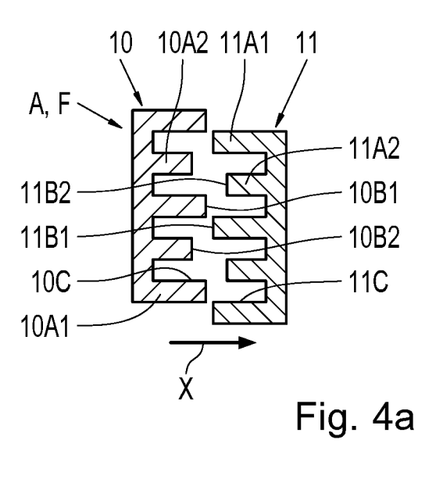
FIGS. 4a-4f show various, highly schematic views of various operating conditions of a form-locking shift element corresponding to FIG. 3a, whose dog elements have different lengths.
Figure 4B:
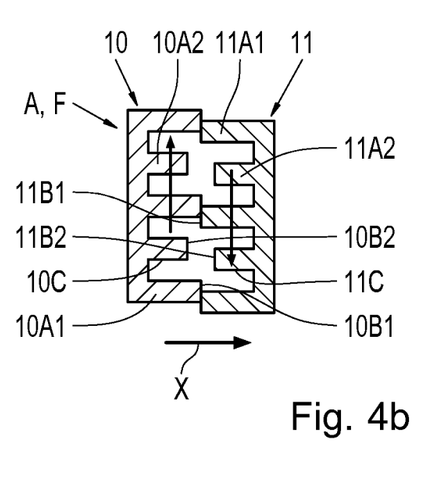

Initially, the completely disengaged operating condition of the shift element A, F is represented in FIG. 4a. FIG. 4b shows the operating condition of the form-locking shift element A, F during a rattling operation. During the rattling operation, the shift-element halves 10, 11 glide off of one another, at the end faces 10B1, 11B1 of the longer dog elements 10A1, 11A1 in the circumferential direction. Therefore, the positive engagement between the shift-element halves 10, 11 is not established. This rattling operation is preventable or ended to the extent described with reference to FIG. 3b by reducing the differential speed between the shift-element halves 10, 11.

Figure 4C:
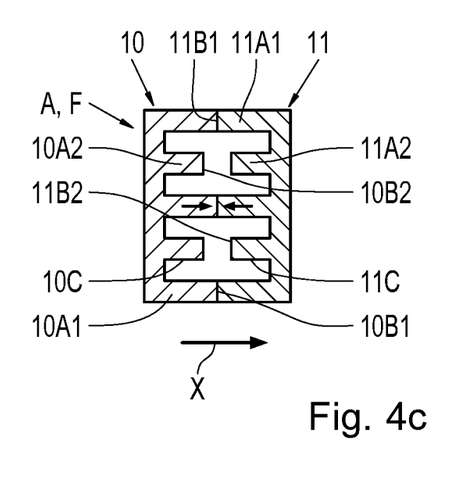
Figure 4D:
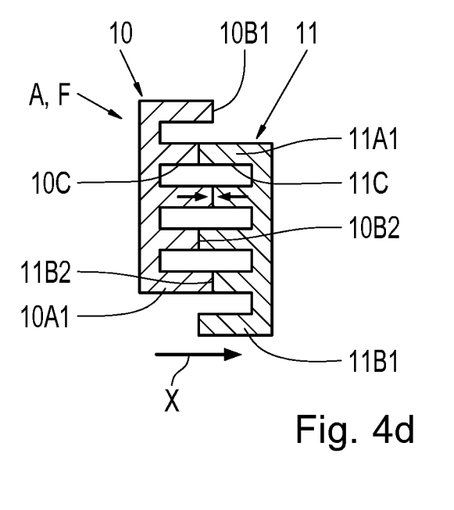

Moreover, FIG. 4c and FIG. 4d each show a tooth-on-tooth position, which prevents the establishment of the positive engagement between the shift-element halves 10, 11. In the operating condition of the form-locking shift element A, F represented in FIG. 4c, the tooth-on-tooth position is between the end faces 10B1, 11B1 of the longer dog elements 10A1, 11A1. In contrast thereto, the tooth-on-tooth position between the shift-element halves 10, 11 in the operating condition of the form-locking shift element A, F represented in FIG. 4d is between the end faces 11B1 of the longer dog elements 11A1 of the second shift-element half 11 and the end faces 10B2 of the shorter dog elements 10A2 of the first shift-element half 10.

Figure 4E:
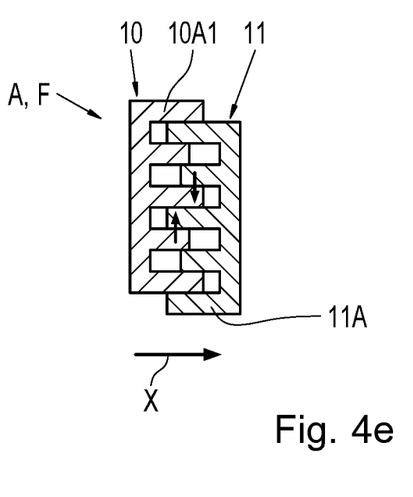

Regardless thereof, the particular tooth-on-tooth position between the shift-element halves 10, 11 is releasable or preventable in the way described with respect to FIG. 3c. FIG. 4e shows an intermediate operating condition of the form-locking shift element A, F between the completely disengaged operating condition and the completely engaged operating condition of the form-locking shift element A, F.

During this intermediate operating condition, flank clamping—described above—between the dog elements 10A1, 10A2, 11A1, 11A2 of the shift-element halves 10, 11 occurs. The flank clamping is preventable or releasable to the extent described with reference to FIG. 3d in order to disengage or engage the form-locking shift element A, F to the demanded extent.

Figure 4F:
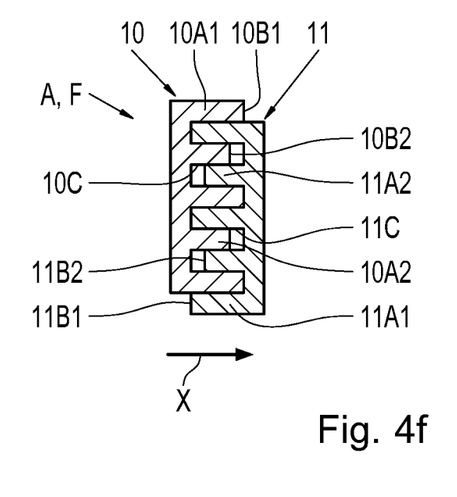

The completely engaged operating condition of the form-locking shift element A, F is represented in FIG. 4f.

An advantageous embodiment of a learning routine is described in the following. With the learning routine, reference values corresponding to the end positions of the shift-element halves 10, 11 shown in FIG. 3a and FIG. 3e, and in FIG. 4a and FIG. 4f, respectively, are determined using sensors associated with the form-locking shift elements A, F. The learning routine is initially carried out, starting from a completely disengaged operating condition of the form-locking shift element A, F, towards the completely engaged operating condition of the form-locking shift element A, F. During this operating condition change of the form-locking shift element A, F, the end positions of the shift-element halves 10, 11 corresponding to the engaged operating condition of the form-locking shift element A, F are determined. Thereafter, the learning routine is carried out for the operating condition change of the form-locking shift element A, F starting from the completely engaged operating condition towards the completely disengaged operating condition. During this operating condition change of the form-locking shift element A, F, the end positions of the shift-element halves 10, 11 are determined that correspond to the completely disengaged operating condition of the form-locking shift element A, F.

In the embodiment of the form-locking shift elements A, F, in which only one of the two shift-element halves 10, 11 is displaceable in the axial direction with respect to the other shift-element half 10, 11, only the axial actuating movement of the movable shift-element half 10, 11 is monitored with the particular associated sensor. If both shift-element halves 10, 11 are movable with respect to one another in the axial direction, however, the actuating movements of the shift-element halves 10, 11 are monitored with the associated sensor. The end positions of the shift-element halves 10, 11 are determined via the learning routine regardless of which end positions of the shift-element halves 10, 11 are determined first.

During the determination of the reference values of the sensor, which, in the completely engaged operating condition of the form-locking shift element A, F, correspond to the end positions of the shift-element halves 10, 11, the differential speed between the shift-element halves 10, 11 at the instant of engagement is guided to values within the differential speed range necessary therefor. Thereupon, the differential speed between the shift-element halves 10, 11 has values close to the synchronous speed of the form-locking shift element A, F. This measure ensures that the form-locking shift element A, F are reliably engaged and that a rattling operation, and therefore damage of the form-locking shift element A, F, is prevented.

In the transmission 3 considered in the present case, the differential speed between the shift-element halves 10, 11 of the form-locking shift elements A, F is implemented with an appropriate actuation of the friction-locking shift elements B-E.

Since there is the possibility of a tooth-on-tooth position and/or a flank clamping during the demanded engagement process of the form-locking shift element A, F, the form-locking shift element A, F is actuated in the way described in greater detail in the following. So-called countermeasures against potential tooth-on-tooth positions and against a potential flank clamping are implemented in this case. This is necessary, since the actuating movement of the shift-element half 10, 11 or of both shift-element halves 10, 11 in the engagement direction is zero during a tooth-on-tooth position as well as during a flank clamping. Thereupon, it is possible that the particular current position of the shift-element half/halves 10, 11 is erroneously considered by the sensor to be the position that corresponds to the completely engaged operating condition of the form-locking shift element A, F.

For this reason, the torque present at the form-locking shift element A, F during the engagement process is raised before the meshing of the shift-element halves 10, 11, i.e., before an overlap forms between the dog elements 10A, 11A; 10A1, 11A1, and, additionally, the axial engagement force is reduced to release or prevent a potential tooth-on-tooth position.

Thereafter, the torque present at the form-locking shift element A, F is reduced and the axial actuating force present at the shift element A, F in the engagement direction is increased if it is assumed that the shift-element halves 10, 11 are in partial overlap with one another. Due to this approach, a potential flank clamping between the shift-element halves 10, 11 is released or prevented.

The above-described measures ensure that the shift-element halves 10, 11 of the form-locking shift element A, F reach the end positions corresponding to the completely engaged operating condition of the form-locking shift element A, F and the reference values of the sensor corresponding thereto are determined.

In order to determine the end positions of the shift-element halves 10, 11 corresponding to the completely disengaged operating condition of the form-locking shift element A, F, the learning routine is carried out, starting from a completely engaged operating condition of the form-locking shift element A, F, to the extent described in greater detail in the following.

For this purpose, the completely engaged form-locking shift element A, F is initially actuated or activated in the disengagement direction with the maximum possible actuating force. Simultaneously, the torque present at the form-locking shift element A, F is reduced to the greatest possible extent. The reduction of the torque present at the form-locking shift element A, F takes place, for example, by disengaging all shift elements A-F. In such an operating condition of the transmission 3, the power flow in the transmission 3 between the transmission input shaft 5 and the transmission output shaft 6 is interrupted and, therefore, the torque present at the form-locking shift element A, F is minimal. With this approach, it is very likely ensured that the form-locking shift element A, F is transferred into its completely disengaged operating condition and the sensor faultlessly determines the end positions of the shift elements 10, 11.

The particular determined reference values, which correspond to the disengaged operating condition and to the engaged operating condition of the form-locking shift element A, F, are stored for the interim in a memory provided for this purpose.

In order to prevent a faulty determination of these end positions of the shift-element halves 10, 11, it is provided that the learning routine is carried out several times in succession. The particular determined end positions of the shift-element halves 10, 11 of the form-locking shift elements A, F are compared to one another. If the particular determined reference values of the sensors deviate only slightly from one another, it is assumed that a determination of the reference values is sufficiently accurate. Thereafter, the reference values are stored in a non-volatile memory of a control unit, preferably of the transmission control unit.

If the determined reference values, which correspond to the disengaged operating condition and to the engaged operating condition of the form-locking shift element A, F, have been determined one time, the operating range of the form-locking shift element A, F is additionally subdivided into temperature and pressure classes. Thereafter, a reference value or a position value of the end position is determined every time a position is reached, which corresponds either to the disengaged operating condition or to the engaged operating condition of the form-locking shift element A, F. This newly determined position value of the end position of the movable shift-element half 10 is compared to the previously determined position value of the end position, which is associated with the temperature and pressure class, for which the new position value was determined. If the currently determined position value is greater than the previously determined position value, the previously determined position value of the currently considered temperature and pressure class is increased by a defined value. If the currently determined position value is less than the previously determined position value, the previously determined position value of the currently considered temperature and pressure class is decreased by a defined value.

The particular adapted value is stored for the current temperature and pressure class and is utilized as a reference value for further adaptation steps.

If a predefined number of adaptations was carried out for a temperature and pressure class, the parameterizable value or the predefined increment is reduced, by which the previously determined position value is increased or decreased. As a result, it is easily achieved that the adaptation is carried out in a rougher and faster manner at the beginning and, as the operating time increases, deviations between two adaptation steps are taken into account to a lesser extent. Therefore, faulty sensor signals have substantially less influence on a system that has already been fully adapted.

The adaptation values determined to the latter-described extent are first added to or subtracted from the initially learned end positions of the shift-element half 10 as an offset if a parameterizable number of adaptations were carried out for both end positions of the shift-element half 10. In this way, it is ensured that the adaptations depict the physical end positions of the shift-element half 10 as precisely as possible before they are utilized for end position detection.

Alternatively, or additionally, it is also possible to carry out the adaptation of the position values of the end positions of the shift-element half 10 depending on defined driving situations. These types of driving situations represent, for example, a coasting mode or a traction mode of the vehicle drive train 1. Moreover, the adaptation is also carried out during a vehicle standstill or when a ratio has been selected for travel in reverse "R".

As the sensor maturity increases, the temperature-dependent classes are also replaceable by a characteristic curve, whose slope and support point are adapted with such adaptation.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 vehicle drive train
2 prime mover
3 transmission
4 driven end
5 transmission input shaft
6 transmission output shaft
7 torsion damper
8 hydrodynamic torque converter
9 torque converter lockup clutch
10, 11 shift-element half
10A, 10A1, 10A2 dog element
11A, 11A1, 11A2 dog element
10B, 10B1, 10B2 end face of the dog element
10C flank of the dog element
11B, 11B1, 11B2 end face of the dog element
11C flank of the dog element
"1" to "9" transmission ratio for forward driving
A to F shift element
P1 to P4 planetary gear set
"R" transmission ratio for travel in reverse

The invention claimed is:

1. A method for determining reference values of a sensor, the reference values corresponding to a disengaged operating condition or an engaged operating condition of a hydraulically actuatable, form-locking shift element (A, F), wherein at least one operating parameter of the form-locking shift element (A, F) is detected with the sensor during a disengagement and during an engagement of the form-locking shift element (A, F), the method comprising:
   subdividing an operating range of the shift form-locking element (A, F) into temperature and pressure classes;
   determining a deviation between a current reference value for a temperature and pressure class of the temperature and pressure classes and an adapted reference value previously determined for the temperature and pressure class; and
   increasing or decreasing the adapted reference value by a predefined increment based on the deviation.

2. The method of claim 1, wherein the predefined increment for each temperature and pressure class is reduced as a number of adaptations of the previously determined reference value of the respective temperature and pressure class increases.

3. The method of claim 1, further comprising varying a torque at the form-locking shift element (A, F), an actuation force of the form-locking shift element (A, F), and a differential speed between shift-element halves (10, 11) of the form-locking shift element (A, F) during the determination of the reference values of the sensor such that the form-locking shift element (A, F) is transferred into the disengaged operating condition or into the engaged operating condition.

4. The method of claim 1, further comprising applying an actuation force on the form-locking shift element (A, F) during the determination of the reference value of the sensor corresponding to the disengaged operating condition of the form-locking shift element (A, F), wherein the actuation force is greater than a threshold value and acts in a disengagement direction of the form-locking shift element (A, F).

5. The method of claim 1, further comprising adjusting a torque at the form-locking shift element (A, F) to less than a threshold value during the determination of the reference value of the sensor corresponding to the disengaged operating condition of the form-locking shift element (A, F).

6. The method of claim 1, further comprising adjusting a differential speed between shift-element halves (10, 11) of the form-locking shift element (A, F), during the determination of the reference value of the sensor corresponding to the engaged operating condition of the form-locking shift element (A, F), to within a speed range that encompasses the zero point, wherein the shift-element halves (10, 11) are brought into engagement with each other in a form-fitting manner within the speed range.

7. The method of claim 1, further comprising adjusting a torque at the form-locking shift element (A, F) to greater than a threshold value, during the determination of the reference value of the sensor corresponding to the engaged operating condition of the form-locking shift element (A, F) and before a positive engagement between the shift-element halves (10, 11), wherein a tooth-on-tooth position between the shift-element halves (10, 11) does not occur when the torque at the form-locking shift element (A, F) is above the threshold value.

8. The method of claim 1, further comprising adjusting an actuation force at the form-locking shift element (A, F) to less than a threshold value during the determination of the reference value of the sensor corresponding to the engaged operating condition of the form-locking shift element (A, F) and before a positive engagement between the shift-element halves (10, 11), wherein a tooth-on-tooth position between the shift-element halves (10, 11) does not occur and the form-locking shift element (A, F) is transferable into the engaged operating condition when the actuation force at the form-locking shift element (A, F) is below the threshold value.

9. The method of claim 1, further comprising adjusting a torque at the form-locking shift element (A, F) to less than a threshold value during the determination of the reference value of the sensor corresponding to the engaged operating condition of the form-locking shift element (A, F) and in the presence of a positive engagement between the shift-element halves (10, 11), wherein flank clamping between the shift-element halves (10, 11) does not occur when the torque at the form-locking shift element (A, F) is below the threshold value.

10. The method of claim 1, further comprising adjusting an actuation force at the form-locking shift element (A, F) to greater than a threshold value during the determination of the reference value of the sensor corresponding to the engaged operating condition of the form-locking shift element (A, F) with a positive engagement between the shift-element halves (10, 11), wherein flank clamping between the shift-element halves (10, 11) does not occur and the form-locking shift element (A, F) is transferable into the engaged operating condition when the actuation force at the form-locking shift element (A, F) is above the threshold value.

11. The method of claim 1, wherein the form-locking shift element (A, F) has a first shift-element half (10) and a second shift-element half (11), the operating parameter of the form-locking shift element (A, F) corresponding to movement of the first shift-element half (10) relative to the second shift-element half (11) of the form-locking shift element (A, F).

12. The method of claim 1, wherein the form-locking shift element (A, F) is a shift element of a transmission (3), the transmission (3) comprising further shift elements (B, C, D, E), the further shift elements (B, C, D, E) being friction-locking shift elements, wherein the torque at the form-locking shift element (A, F) is varied by actuating the friction-locking shift elements (B, C, D, E).

13. The method of claim 12, wherein the transmission (3) further comprises a transmission input shaft (5), wherein the torque at the form-locking shift element (A, F) is varied by adjusting a torque at the transmission input shaft (5).

14. A computer program comprising program code stored on a non-transitory computer-readable medium with software instructions to carry out the method of claim 1 when executed on a control unit.

15. A control unit for determining reference values of a sensor, the reference values corresponding to a disengaged operating condition or an engaged operating condition of a form-locking shift element (A, F), wherein at least one operating parameter of the form-locking shift element (A, F) is detected with the sensor during a disengagement and during an engagement of the form-locking shift element (A, F), wherein the control unit is configured to:
- subdivide an operating range of the form-locking shift element into temperature and pressure classes;
- determine deviation between a current reference value for a temperature and pressure class of the temperature and pressure classes and an adapted reference value previously determined for the temperature and pressure class; and
- increase or decrease the adapted reference value by a predefined increment based on the deviation.

16. The control unit of claim 15, wherein a control side of the control unit is configured to:
- subdivide the operating range of the form-locking shift element into the temperature and pressure classes;
- determine the deviation between the current reference value for the temperature and pressure class of the temperature and pressure classes and the adapted reference value previously determined for the temperature and pressure class; and
- increase or decrease the adapted reference value by the predefined increment based on the deviation.

* * * * *